US009404760B2

(12) United States Patent
Ulloa Paredes

(10) Patent No.: US 9,404,760 B2
(45) Date of Patent: Aug. 2, 2016

(54) EFFICIENT ROUTE PLANNING IN PUBLIC TRANSPORTATION NETWORKS

(71) Applicant: Xerox Corporation, Norwalk, CT (US)

(72) Inventor: Luis Rafael Ulloa Paredes, Meylan (FR)

(73) Assignee: Xerox Corporation, Norwalk, CT (US)

( * ) Notice: Subject to any disclaimer, the term of this patent is extended or adjusted under 35 U.S.C. 154(b) by 110 days.

(21) Appl. No.: 14/450,628

(22) Filed: Aug. 4, 2014

(65) Prior Publication Data

US 2016/0033283 A1    Feb. 4, 2016

(51) Int. Cl.
*G01C 21/34*     (2006.01)
*G06Q 10/02*    (2012.01)

(52) U.S. Cl.
CPC ............ *G01C 21/3423* (2013.01); *G06Q 10/02* (2013.01)

(58) Field of Classification Search
CPC ............. G01C 21/3423; G01C 21/343; G01C 21/3446; G01C 21/3484; G01C 21/3453; G01C 21/34
See application file for complete search history.

(56) References Cited

U.S. PATENT DOCUMENTS

| 8,090,532 | B2 | 1/2012 | Tashev et al. | |
| 8,494,771 | B2 | 7/2013 | Delling et al. | |
| 2012/0253929 | A1* | 10/2012 | Alberth | G01C 21/343 705/14.53 |
| 2013/0046456 | A1* | 2/2013 | Scofield | G01C 21/3423 701/117 |
| 2013/0304381 | A1 | 11/2013 | Nesbitt | |
| 2014/0032113 | A1 | 1/2014 | Nesbitt | |
| 2015/0204685 | A1* | 7/2015 | Gearhart | G01C 21/36 701/533 |

FOREIGN PATENT DOCUMENTS

| EP | 2051223 A1 | 4/2009 |
| JP | 2002154612 A | 5/2002 |
| WO | WO-0161276 A2 | 8/2001 |
| WO | WO-2007061264 A1 | 5/2007 |
| WO | WO-2009092812 A1 | 7/2009 |

OTHER PUBLICATIONS

Delling et al., "Round-Based Public Transit Routing", Proceedings of the 14th Meeting on Algorithm Engineering and Experiments (ALENEX'12).

* cited by examiner

*Primary Examiner* — Spencer Patton
(74) *Attorney, Agent, or Firm* — Fox Rothschild LLP

(57) ABSTRACT

This document discloses a system that selects a path to reach a destination in a transportation network. The system receives information related to a public transportation network with multiple stops. Each stop includes at least one associated link with another stop. Each link represents a mode of transportation between two stops. When the system receives a request for routes between an origin and a destination within the transportation network, it will determine a set of routes between the origin and the destination using an iterative process without reference to a graph representation of the network. The system will select a shortest path that corresponds to the route having the earliest arrival time at the destination. The system will also select an alternative path that corresponds to a route having an arrival time that is no more than a threshold amount later than the earliest arrival time.

18 Claims, 10 Drawing Sheets

EFFICIENT ROUTE PLANNING IN PUBLIC TRANSPORTATION NETWORKS

BACKGROUND

The present disclosure relates to determining routes in a transportation system, such as a public bus, train or plane system. More specifically, the present disclosure relates to efficiently determining routes in a transportation system for providing alternative choices to travelers within the transportation system.

Study and analysis of transportation systems generally focus on improving efficiency within the transportation system. One typical area of study is traveling from a starting point to a finishing point as fast and efficiently as possible. Such study and analysis has resulted in multiple algorithms and simulation techniques for answering the question "how do I find the shortest and least costly path?"

To answer this question, analysts have traditionally used graph path finding algorithms that substitute nodes for places within the transportation system and iteratively search for links between the nodes to identify paths from one node to another. Implementation of the algorithms typically creates a graph of the determined paths within the system in ascending cost order (e.g., an ordered listing of total resources required to traverse a particular path). Thus, through further analysis of the graph, the algorithm can identify the shortest paths. These graph exploration algorithms perform well for road network analysis where preprocessing techniques can identify shortcuts and graph partitions to greatly improve the computation time.

However, when considering a public transportation system, several problems arise. One problem is that when a time dimension is added, the shortest path becomes dependent upon the time or origin, and thus considerably increases the number of possible paths. For example, taking a bus at 12:00 PM may be quicker to get from point A to B than using the light rail, but at 12:05 PM the light rail may be the shorter way. Another problem includes monitoring and updating changes to the graph of the public transportation system in real-time (or, for example, in near real-time such as 15 minute intervals). Such a time demand renders most preprocessing techniques useless, as they often require several hours to analyze the data. Thus, real-time changes to the public transportation system may be missed. To continue the above example, if the bus is running six minutes late (i.e., not arriving until 12:06 PM), it is now faster to take the light rail instead of the bus.

Thus, when adding public transportation systems to road network analysis, there has been a considerable addition of computational time required. For the average trip planner such a delay may not be noticeable as an addition of five or ten seconds computational time may be negligible. However, for more advanced real-time trip planners, waiting a few seconds becomes unpractical, either because the trip-planner is, for example, a scheduling server for a transportation system that performs a high number of route analysis routines at a time, or because the trip planner is a monitoring system sub-routine that is called thousands of time per second by another module (such as a public transportation network analysis module).

As one solution to these added problems, Microsoft Research introduced the round-based public transit routing (RAPTOR) algorithm where, rather than considering a graph based algorithm, the algorithm considers dynamic optimization of multi-criteria journeys (e.g., considering time and number of transfers as is common in a public transportation network). The RAPTOR algorithm may be used to analyze a network to identify journeys in a round by round process. In each round, the algorithm may be used to scan marked routes keeping the shortest time at each stop, and marks routes for next round analysis if new routes are determined to be reachable earlier. The RAPTOR algorithm exploits the intrinsic nature of the public transportation network where each round can be viewed simply as a traveler making a transfer. The RAPTOR algorithm also identifies reachable bi-criteria shortest paths an order of magnitudes faster than existing algorithms. Additional information related to the RAPTOR algorithm can be found in U.S. Pat. No. 8,494,771 entitled "Journey Planning in Public Transportation Networks," the content of which is hereby incorporated by reference in its entirety.

Basically, the RAPTOR algorithm scans available information and stores the information in a data structure such as a linked list or database. The stored information is optimized (e.g., presorted or processed to determine specific data about the information such as node or link characteristics), and an optimal solution is output based upon the input query (e.g., the shortest route between points A and B). When analyzing data, overall performance may be the most important characteristic of the RAPTOR algorithm, and potential solutions or choices may be overlooked to improve performance.

While the RAPTOR algorithm can be effective for determining a shortest path in a transportation system, it is not sufficient to provide alternative paths. If a user desires several options, or if a transportation interruption occurs and alternatives need to be identified, existing systems cannot adequately provide alternative recommendations. If additional variables are introduced in an analysis, such as introducing an option to walk to one of multiple points of origin, the required processing time is still prohibitive.

This document describes methods and systems that address at least some of the problems described above, and/or other problems.

SUMMARY

In one general respect, this document discloses a method of selecting a path to reach a destination in a transportation network. The method is performed by a system that includes a processing device made of one or more processors. The system receives information related to a public transportation network that includes multiple stops. Each of the stops comprises at least one associated link with another one of the stops, where the link represents a mode of transportation between the two stops. When the system receives a request to determine one or more routes between an origin and a destination within the transportation network, it will determine a set of routes through the transportation network between the origin stop and the destination using an iterative process without reference to a graph representation of the network. The system will select, from the determined routes, a shortest path so that the shortest path corresponds to the route having the earliest arrival time at the destination. The system will also select an alternative path that so that the alternative path corresponds to a route having an arrival time that is no more than a threshold amount later than the earliest arrival time. The system will generate an output comprising the shortest path and the alternative path.

When determining the set of routes, the system may scan at least one route from a first departure time, wherein each route comprises a first stop. The system will determine a set of subsequently reachable stops from the first stop of each route, along with a possible arrival time for each subsequently reachable stops. It will then repeat the scanning and determining until either a maximum number of iterations has been reached or no new subsequently reachable stops are identified. The system also may store, in a computer readable medium operably connected to the system, a portion of each route between the origin and the destination in which each subsequently reachable stop can be reached within a threshold time, while not retaining in the computer readable medium any routes in which the subsequently reachable stop cannot be reached within a threshold time. The system also may store route information for a stop being scanned in a cache for access during a next iteration of the iterative process.

Optionally, the system may receive a selection of a primary mode of transit, and it may also identify an alternate mode of transit and a configuration parameter. If so, then when selecting the routes it may only select those routes via which a first stop is reachable via the alternate mode of transit without violating the configuration parameter. An example of an alternate mode of transit includes walking, and example configuration parameters include a maximum walking time, a maximum walking distance, or both.

Optionally, when receiving the request to determine one or more routes between an origin and a destination within the transportation network, the system may also receive an alternate origin. In this situation, the system may include, in the set of routes, at least one route between the alternate origin and the destination. Then, when selecting the alternative path, the system may select as the alternative path a route from the alternate origin to the destination.

Optionally, selecting the alternative path may include identifying at least one trip that makes up the shortest path, and excluding the identified trip from the alternative path.

DETAILED DESCRIPTION

Figure 1:
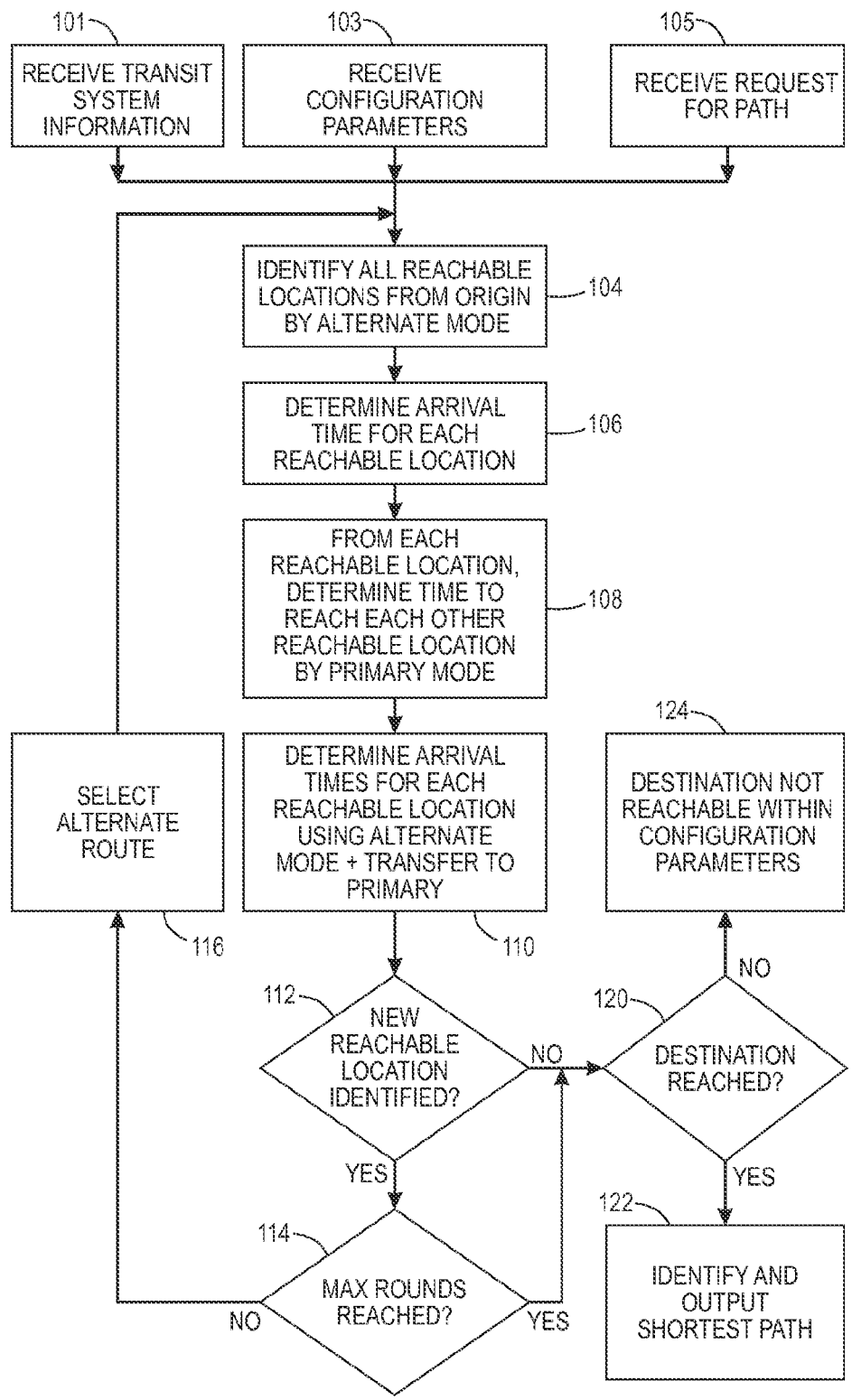
FIG. 1 depicts a sample process for alternating a scanning order for each stop within a transportation network during an iterative scanning process according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "computing device" or "processing device" refers to a device or group of multiple devices that processes data in order to perform one or more functions. A computing device or processing device may include any processor-based device such as, for example, a server, a set of networked servers, a personal computer, a personal digital assistant, a web-enabled phone, a smart terminal, a dumb terminal and/or other electronic device or devices capable of communicating in a networked environment. A computing device or processing device may interpret and execute instructions.

In this document, a "line" refers to a scheduled mode of travel on a transportation network, such as a particular train or bus line and all of its stops. A "path" or "route" refers to the overall procedure that a person may follow to take a trip in a transportation network. A route may include travel along a single line, or on two or more lines including transfers, as well as travel via alternate modes of transportation such as walking. A "trip" represents an instance of travel from an origin point i to a destination point j, and it may be a segment of a route or an entire route. A trip may be represented as $T_{ij}$. Each trip can be defined as an ordered list of "timed-stops." As used herein, a "timed-stop" may be defined as a tuple (including date, time, and a stop identifier) defining when and where a vehicle would commonly stop to pick up passengers.

A "mode" is a term used to identify a one of various different ways of performing transportation, such as but not limited to walking, biking, or traveling by car, bus or train. One mode may include a combination of several other modes. For example "a personal mode" may include walking and biking. A mode may also be a subset of what are considered to be standard modes for example "mode 251" may include running above a certain speed and using a car for less than X number of minutes. During the execution of the process the system may or may not redefine modes.

As used herein, an "origin" refers to a starting point within the transportation network where a passenger or other person traversing at least a position of the network intends to begin their route. Conversely, a "destination" refers to an ending point within the transportation network where the passenger intends to end their route.

The present disclosure is directed to a method and system for providing performance improvement over prior methods while providing techniques for efficiently retrieving alternate paths for travel through a network such as a public transportation system from an origin to a destination. As described in this document, a set or collection usable alternative paths may include paths that: (1) are valid sequences of alighting and boarding stops that reach from a given origin to a given destination; (2) are not the same as other identified paths; (3) are no more than a given period of time longer than the shortest determined path; (4) have at most a set number of transfers; and (5) would be considered different alternatives by a human (i.e., it would have at least one segment or combination of segments that differs from those contained in other identified paths). Unlike prior systems, the systems of this disclosure do not require development of or reference to a graph representation of the transportation system.

Ultimately, the methods as proposed in this document may provide for a more efficient route determination process while providing additional or more refined choices for user review and selection.

FIG. 1 illustrates one proposed process for determining a shortest path and alternate paths between an origin and a destination within a transportation network. The process, or a processing device performing the process, receives transit system schedule information 101 related to various lines of a transportation network. For each line, the transit system schedule information will include data identifying the stops, geographical information for each stop, times for each stop, link or trip information between each stop, and/or other related information. This information may be stored in a database and periodically updated, either by the system or a by a separate system such as one that monitors real-time conditions in a transportation network. The system will also receive a request for a path 105. The request may be received from a user, such as a potential traveler via a user interface or external communication. The request will include, at a minimum, a point of origin, a destination, and a start time or desired arrival time. Some of these data points may be received from a user via a user interface, or they may be determined by an external service. For example, the system may refer to a clock to determine a start time as the present time, or the system may refer to a global positioning service to identify a point of origin.

The system will also receive one or more configuration parameters 103. The configuration parameters are variables that the system will use when determining a shortest path. The configuration parameters may include, for example, a maximum number of rounds to consider in an iterative process, a typical walking speed for the traveler, or a maximum walking distance. If the system has access to schedule information for multiple transit systems (such as bus and train), the configuration parameters may also include a primary mode of transportation (such as a train or bus or as described above a fusion of both) so that the system knows which transit system's information to access. Any or all of the configuration parameters also may be received from the user. Or, any or all of the configuration parameters may be determine by the system using one or more rules, such as rules that particular default parameters should be used unless changed by a user or by the system in response certain conditions having been satisfied.

Once the request is received, the configuration parameters identified and the transit information accessed, the system will identify all reachable locations in the transit system from the point of origin by an alternate mode of transportation 104. The alternate mode of transportation will be one other than the primary mode. For example, if the primary mode is a train system, the alternate mode may be walking. To be "reachable," a location must be a stop that is reachable by the alternate mode of transportation while satisfying the configuration parameters. For example, if the alternate mode is walking, then a reachable location may be required to be no more than a threshold distance away from the point of origin, or no more than a threshold expected walking time away from the point of origin.

The system will determine an arrival time for each reachable location 106 and then, from each reachable location determined in step 106, determine a time to reach every location that subsequently reachable using the primary mode of transportation 108. The system will then determine the ultimate arrival times for each subsequently-reachable location 110. These ultimate arrival times will be those after the passenger uses the alternate mode to the initial reachable location and then the primary mode from the initial reachable location to the subsequently reachable location.

If the system determines 112 that the set of subsequently reachable locations (identified in step 108) includes a location that was not identified in the initial set of reachable locations (identified step 104), then so long as the system has not already performed a maximum number of iterations/rounds 114 (as set by the configuration parameters) the system may proceed to a next iteration (i.e., increment a number of rounds), select an alternate route that includes a maximum number of transfers that is no more than the round count 116 and repeat the process.

On the other hand, if no new reachable location was identified 112 and the maximum number of rounds was not reached 114, then the system may determine whether the any of the initially-reachable or subsequently-reachable locations includes the destination 120. If so, then the system will determine which of the identified paths reaches the destination at the earliest time, and it will return that location as the shortest path 122. It the destination was not reached in any round, then it will generate an output indicating that the destination was not reachable within the established configuration parameters 124.

Figure 2:
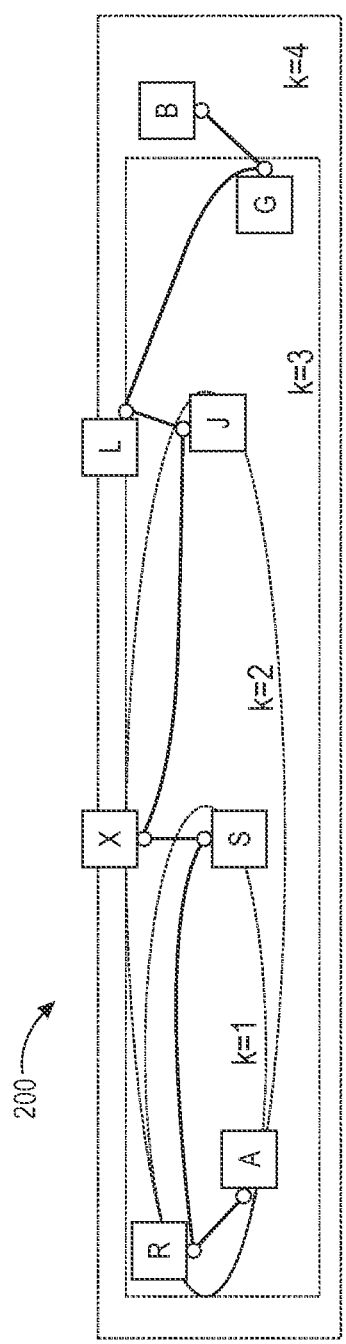
FIG. 2 depicts a comparison of route determinations according to an embodiment.

FIG. 2 illustrates a set of comparison sample network diagrams illustrating information determined in each round of the route determination algorithm. To provide background for the network, there are walking links between stops R and A, between stops S and X, between stops J and L, and between stops G and B. Similarly, there are vehicle routes between stops R and S, between stops X and J, and between stops L and G.

As shown in FIG. 2, a network diagram 200 illustrates route information as determined through each round of a process such as that described above. In the diagram 200, the squares represent stops, while the links between the squares represent possible paths between stops. The primary mode of transportation (train) is available along paths R→S, X→J and L→G, To travel along paths A→R, S→X, J→L and G→B an alternate mode of transportation such as walking is required. The variable k is the configuration parameter corresponding to the maximum number of rounds that the system will consider, and thus also the maximum number of transfers that a passenger will make during a trip. As shown, if the origin is stop A and the number of transfers k=1, the reachable stops are R and S. If the maximum number of transfers k=2, the reachable stops from stop A then also include stops X and J. If the maximum number of transfers k increases to 3 the reachable stops also include stops L and G. Finally, stop B is only reachable if the maximum number of transfers k is at least 4.

Figure 3:
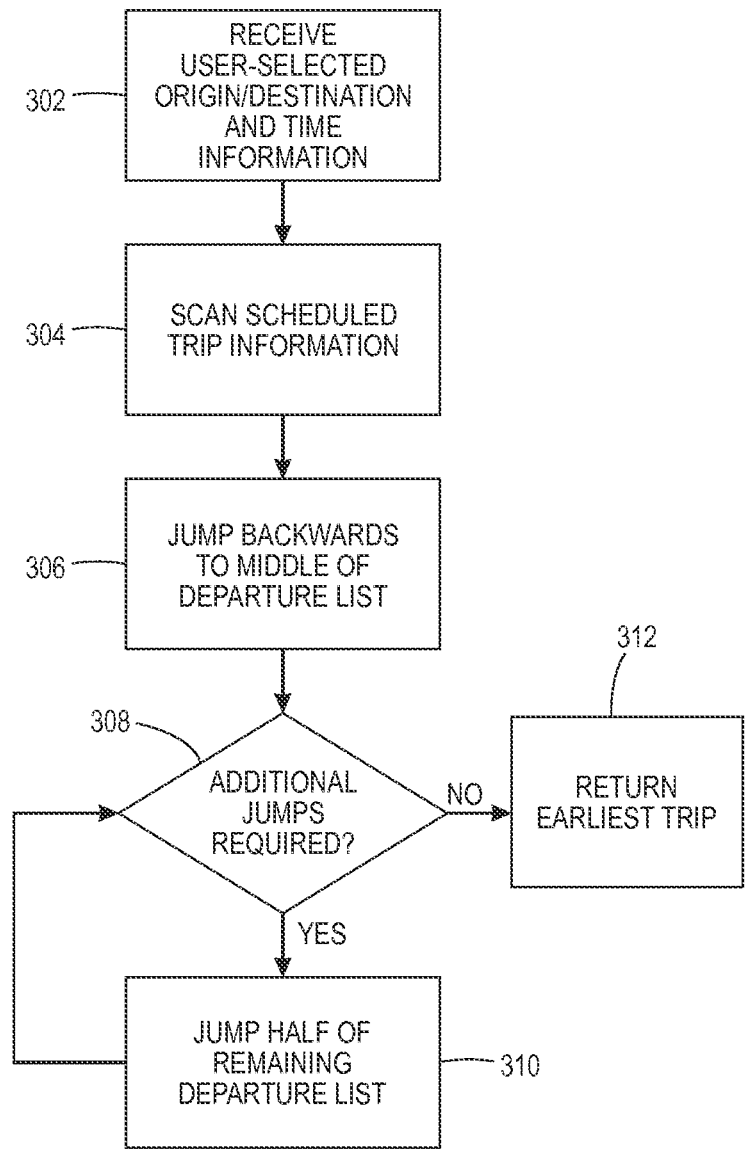
FIG. 3 depicts a sample process for traversing a departure times list according to an embodiment.

Optionally, the system may use additional functions and techniques to further optimize or otherwise improve the process. For example, when identifying the reachable locations (step 106) and/or subsequently reachable locations (step 108) rather than identifying each location the system may only consider those locations that will result in a lower trip time. For example, when the system determines an arrival time for a first path between origin O and destination D, it may then only search for subsequent routes that will reach destination D at or earlier than the arrival time of the first path. An example of this is shown in FIG. 3, in which the system may receive 302 user-selected origin/destination information as well as time information including, for example, a desired departure time from the origin and/or a desired arrival time at the destination. Based upon this information, the processing device may scan 304 a set of stored scheduled trips for the relevant routes contained within the transportation network.

The stored scheduled trips may be obtained from the transit system schedule information, or from earlier steps of the process.

Figure 4:
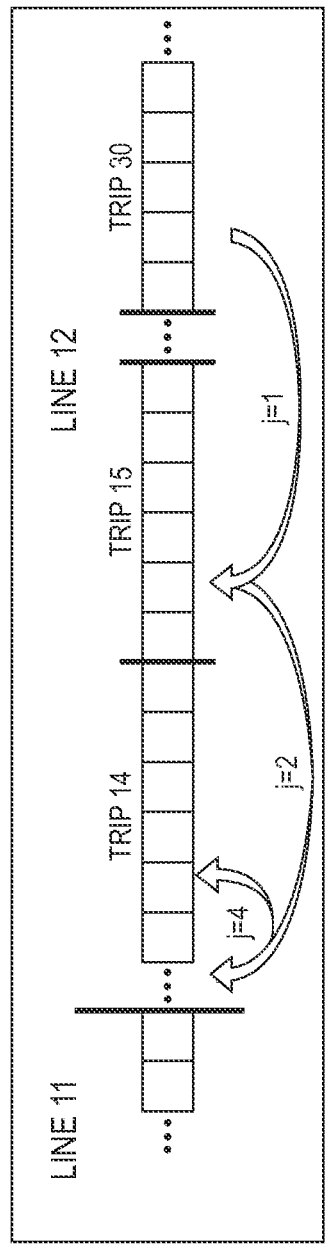
FIG. 4 depicts a traversal technique according to an embodiment.

Using the process as described in FIG. 1, the processing device may quickly determine which is the earliest trip from a particular stop at a particular time, and can scan 304 the stored scheduled trip information that is relevant to the origin time and place. This is shown in the example of FIG. 4, in which there are 30 trips for a single line (Line 12) sorted by departure time. The system starts with one trip (such as Trip 30 at the end) then uses a binary search to rule out half of the possible trips. This process repeats until the earliest trip (Trip 14) is returned. For example, referring again to FIG. 3, the system may start by jumping 306 backwards to the middle of the departure list. As used herein, the term "jump" refers to determining a marker or other identification device contained within the departure list for a specific trip contained within the list. Thus, for example, to jump 306 to the middle of the departure list the processing device can determine which marker (e.g., table key) is associated with the middle of the departure list.

The processing device may determine 308 whether this is the optimum trip for the user (i.e., satisfies the user's required origin/destination information as well as the timing information) or if additional jumps are required. If additional jumps are required, the processing device may jump 310 half of the remaining list. Prior to jumping, the processing device may determine whether the middle of the departure list is too early or too late based upon the user-selected criteria. If the middle is too late, the processing device may jump 310 further backwards into the list. If the middle is too early, the processing device may jump 310 forward into the list. Again, after jumping 310, the processing device may determine 308 whether additional jumps are required. If additional jumps are required, the system may repeat the direction determination and jumping process as described above. If the processing device determines 308 that additional jumps are not required, the processing device may return 312 the earliest trip to the user. For example, the processing device may provide the user with a detailed listing of the optimal route as a direct message (e.g., via a text message or email), or as an informational listing in a graphical user interface such as a browser window.

As another variation that may improve the process, when the system determines arrival times for each subsequently reachable location (i.e., step 106 or 110 of FIG. 1), it ignore paths that will not arrive at the destination by a desired arrival time. This can reduce the processing required, since the process of searching for earlier trips can be computationally expensive. In addition, the system may not save or cache every possible path, but instead it may only save those which are useful, such as those paths that reach the destination by a desired arrival time within the configuration parameters.

Figure 5:
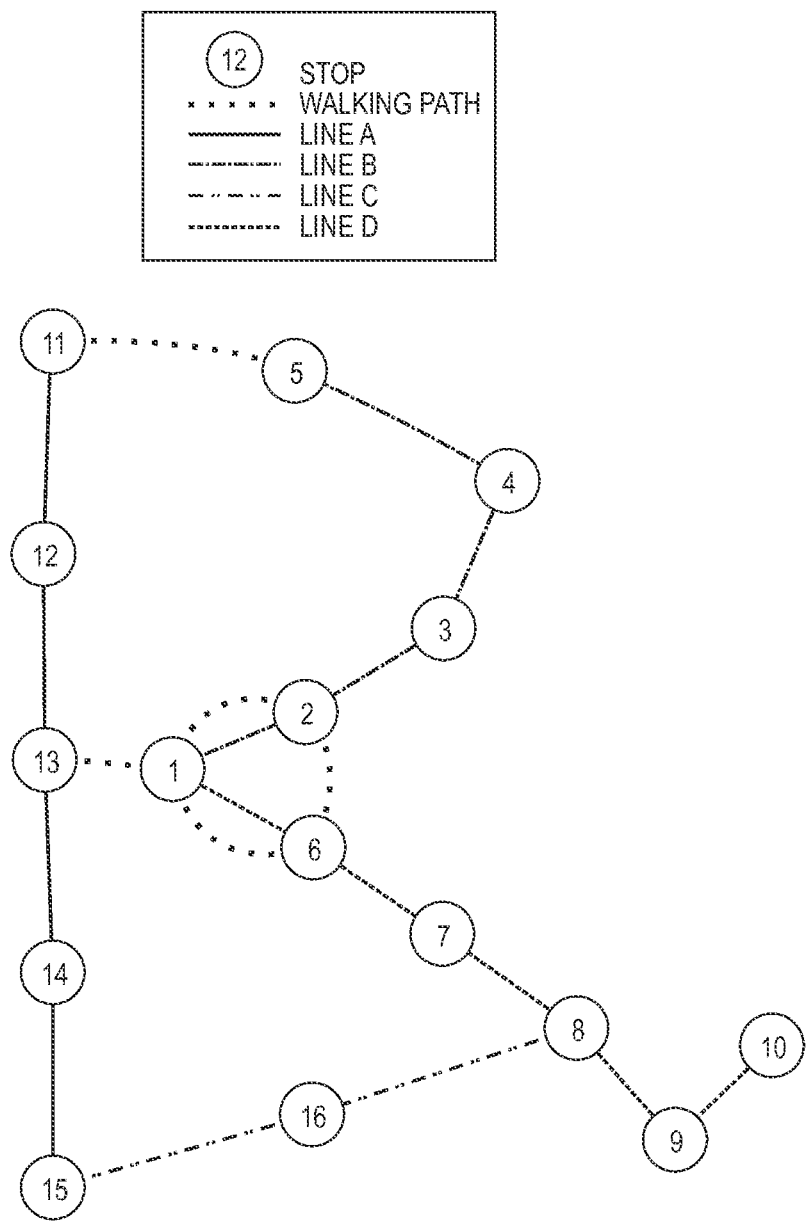
FIG. 5 is a graphic depiction of route and scheduling data for a transportation network.

To provide an option for alternative routes, in some embodiments the system may consider (place, time) tuples to determine the earliest possible arrival to all possible locations from a particular point of origin. For example, FIG. 5 illustrates a set of 15 stops in a transit network, along with possible routes of travel between the stops. When starting at stop 1 with a destination of stop 15 and using walking as the first mode of transit, the system may determine which stops are reachable within a threshold walk time (e.g., 3 minutes) and determine that stops 2, 6 and 13 are reachable stops. (Stop 1 is also reachable since it is the point of origin.) Then, from each of the reachable stops, in a first iteration the system may determine a subsequent set of reachable stops and arrival times. As an example, in this iteration the system may determine that, if the passenger starts walking from stop 1 at 8:00, the subsequently reachable stops are:

(1) From stop 1 (8:00), Line B departs at 8:10 and Line D departs at 8:05. The subsequently reachable stops are then stop 2 (8:11 via Line B), stop 3 (8:15 via Line B), stop 4 (8:18 via Line B), stop 5 (8:21 via Line B); stop 6 (8:06 via Line D), stop 7 (8:09 via Line D), stop 8 (8:12 via Line D), stop 9 (8:16 via Line D), and stop 10 (8:19 via Line D).

(2) From stop 2 (8:02 after walking 2 minutes), Line B departs at 8:11. The subsequently reachable stops are then stop 3 (8:15 via Line B), stop 4 (8:18 via Line B), stop 5 (8:21 via Line B).

(3) From stop 6 (8:03 after walking 3 minutes), Line D departs at 8:06. The subsequently reachable stops are then stop 7 (8:09 via Line D), stop 8 (8:12 via Line D), stop 9 (8:16 via Line D), and stop 10 (8:19 via Line D).

(4) From stop 13 (8:02 after walking 3 minutes), Line A departs at 9:00. The subsequently reachable stops are then stop 14 (9:10 via Line A) and stop 15 (9:15 via Line A).

The system may then store data corresponding to earliest arrival time and route for each potential destination (i.e., each reachable stop) as show in Table 1 below:

TABLE 1

| Reachable Stop | Earliest arrival time |
| --- | --- |
| 1 | 8:00 |
| 15 | 9:15 |
| 13 | 8:02 |
| 2 | 8:02 |
| 6 | 8:03 |
| 3 | 8:15 |
| 4 | 8:18 |
| 5 | 8:21 |
| 7 | 8:09 |
| 8 | 8:12 |
| 9 | 8:16 |
| 10 | 8:19 |
| 14 | 9:10 |

The system may then receive another request with an additional point of origin: stop 7. The request may be generated by a user, or automatically by the system based on one or more criteria that prompt it to identify another point of origin (such as a transit interruption or delay at the original point of origin). From stop 1 one can still walk to reachable stops 2, 6 and 13, but from stop 7 one cannot walk anywhere. Here, the subsequently reachable destinations are now those listed above from stop 1, plus those reachable from stop 7, and in particular: take Line D to stop 8 (8:03), stop 9 (8:07) or stop 10 (8:10).

This results in improved earliest arrival times for stops 7, 8, 9 and 10 as shown in Table 2:

TABLE 2

| Reachable Stop | Earliest arrival time |
| --- | --- |
| 1 | 8:00 |
| 15 | 9:15 |
| 13 | 8:02 |
| 2 | 8:02 |
| 6 | 8:03 |
| 3 | 8:15 |
| 4 | 8:18 |
| 5 | 8:21 |
| 7 | 7:55 |
| 8 | 8:03 |
| 9 | 8:07 |
| 10 | 8:19 |
| 14 | 9:10 |

However, the earliest arrival time to destination stop 15 has still not improved, so the system may proceed to a next iteration to determine, for example, that from reachable stop 8 at 8:30 one may reach stop 16 at 8:40 and stop 15 at 8:50 via Line C. This results in an improvement of the arrival time by nearly 20 minutes.

Thus, the system may return a primary route and an alternative route to the user as:

Option (1): start at stop 7 at 7:55 am, take Line D to stop 8, transfer to Line C at 8:30, and arrive at stop 15 at 8:50; and Option (2): start at stop 1 at 8:00 am, walk to stop 13, take Line A at 9:00, and arrive at stop 15 at 9:15.

Figure 6:
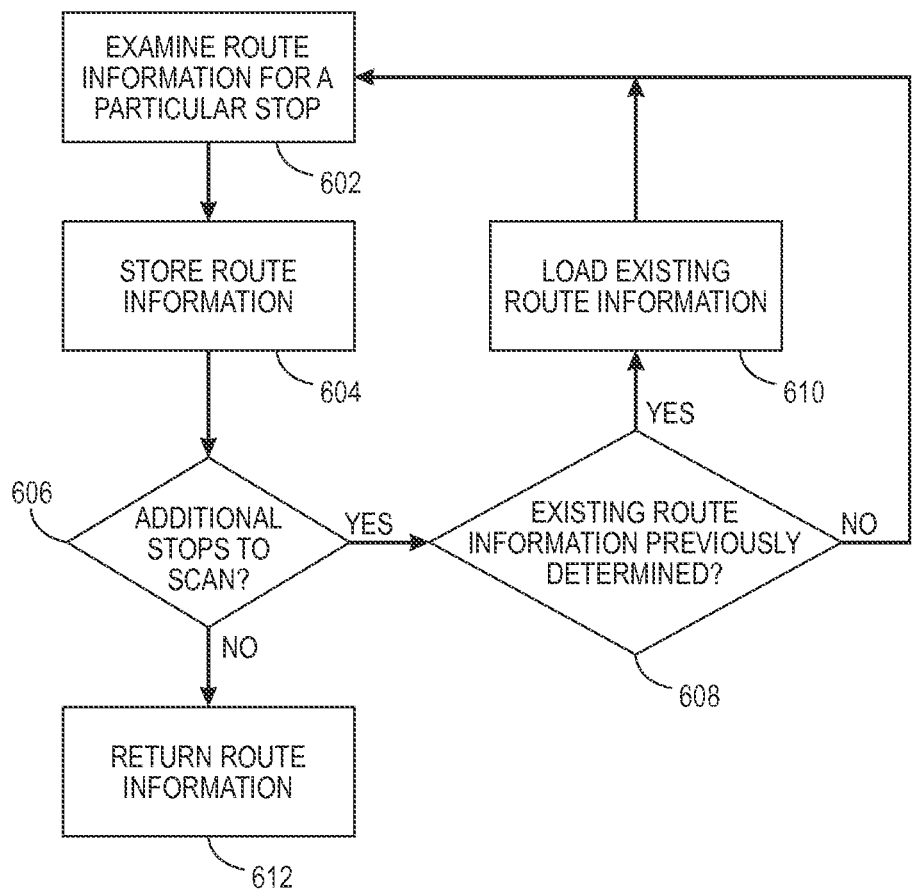
FIG. 6 depicts a sample process for storing information during each iteration of the iterative scanning process according to an embodiment.

FIG. 6 illustrates a further process that can be implemented to improve overall functionality and efficiency of the system. The process as shown in FIG. 6 may be implemented in concert with the process as described in FIG. 1 to reduce overall processing time. The processing device may examine 602 route information for a particular stop using, for example, the process as described in FIG. 1. After examining, the processing device may store 604 selected route information identified as highly relevant or most likely to be used again as it relates to the route search being performed, storing the route information in a data structure such as a database or a linked list.

The processing device may determine 606 whether there are additional stops to scan (e.g., has the scanning process reached the user-selected destination yet). If the processing device determines 606 there are additional stops to scan, the processing device may further determine 608 whether existing route information has been previously determined and stored for that next stop. Thus, rather than merely processing each stop individually (and determining route information for each stop independently of what has already been determined), the processing device can determine 608 whether there is relevant information previously stored. If the processing device does determine 608 that there is existing information, the processing device can load 610 the existing information and examine 602 the next stop. If the processing device does not determine 608 that there is existing information, the processing device can proceed directly to examining 602 the next stop.

Such a process as that described in FIG. 6 provides for a less redundant process as that which already exists. Primarily, the process as shown in FIG. 6 potentially eliminates wasted processing time to determine routes that have already been determined in previous scanning rounds. By implementing such a process, the route optimization algorithm as taught herein can be further optimized to return more robust results in a shorter time period by storing relevant information following each iteration of the scanning process and, if possible, loading that information during a subsequent iteration as opposed to determining the information for a second (or third, fourth, etc.) time.

In addition to storing relevant information, the processing device can also temporarily store information in a quickly accessible data structure such as a cache. For example, when running the algorithm as described herein, the processing device may create a hash table for use as a cache when running the algorithm. Such a technique would provide a temporarily accessible data structure for the processing device to access quickly and efficiently.

Figure 7:
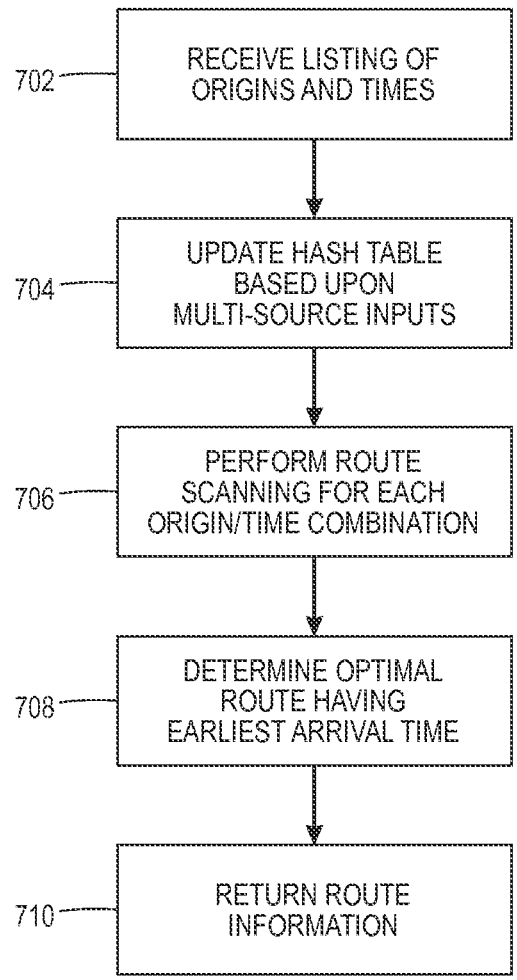
FIG. 7 depicts an improved route analysis algorithm according to an embodiment.

Optionally, when the system uses multi-source inputs, as shown in FIG. 7 the system may receive 702 a listing of passenger's list of possible points of origin, and desired arrival time for reaching a specific destination. Then, while scanning the schedule information for possible routes and reachable stops, the system may update 704 a hash table to include the multi-source input information obtained during the scan. For example, the processing device may alter the hash keys for the table to include a combination of the origin ID as well as the timing information. The processing device may perform 706 the route scanning for each origin/time combination provided by the user, and determine 708 an optimal route from one of the user-provided origins that has the earliest arrival time at the destination Like before, the processing device may return 710 the route information to the user.

Figure 8:
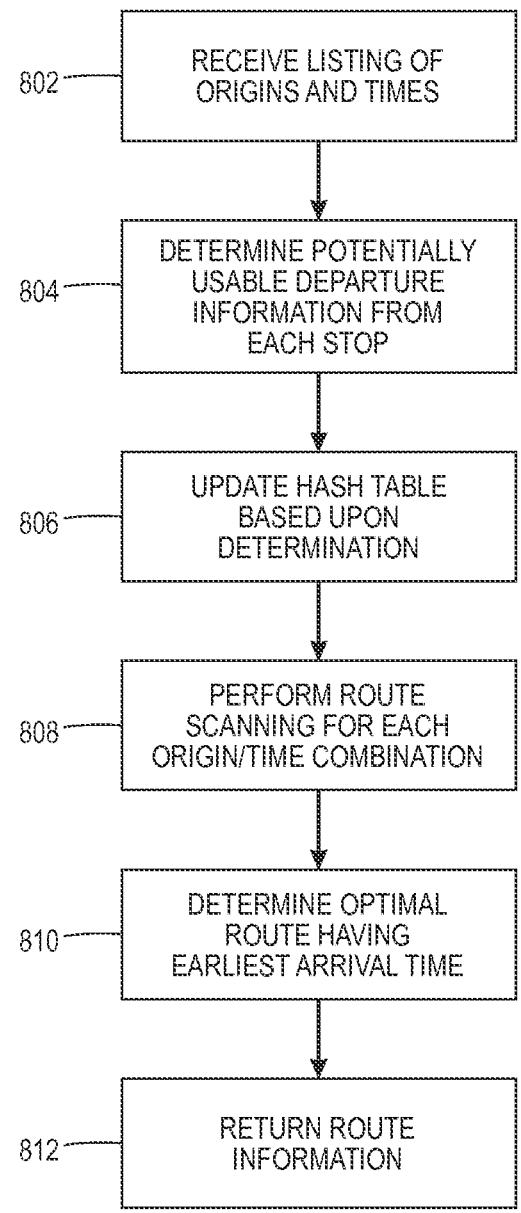
FIG. 8 depicts an improved route analysis algorithm according to an embodiment.

To further improve efficiency, the processing device may perform additional preprocessing of the data prior to performing the iterative scanning process. As each round of the scanning process requires a set amount of time and processing resources, eliminating unnecessary rounds would improve efficiency. For example, as shown in FIG. 8, the processing device may receive 802 a listing of origins and times from a user for reaching a specific destination. The processing device may determine 804 potentially usable departure information from each stop as listed within the departure list, and determine and eliminate any unusable information from future scanning. For example, any departure information that is clearly outside of the timing information provided by the user may be eliminated. Thus, during the scanning process, the processing device may update 806 the hash table to include the multi-source input information obtained during the scan provided it has been determined to be usable information. The processing device may perform 808 the route scanning for each origin/time combination provided by the user, and determine 810 an optimal route from one of the user-provided origins that has the earliest arrival time at the destination Like before, the processing device may return 812 the route information to the user.

To improve efficiency even further, the processing device may perform a determination prior to scanning to determine whether any specific information can be eliminated from the scanning process altogether by determining a level of specificity based upon the user request. For example, the user may indicate that they only want to use a specific vehicle type, or that they want to reduce the number of transfers to a minimum (e.g., less than 2). Thus, the processing device can alter the scanning process by eliminating route data based upon this level of specificity.

Figure 9:
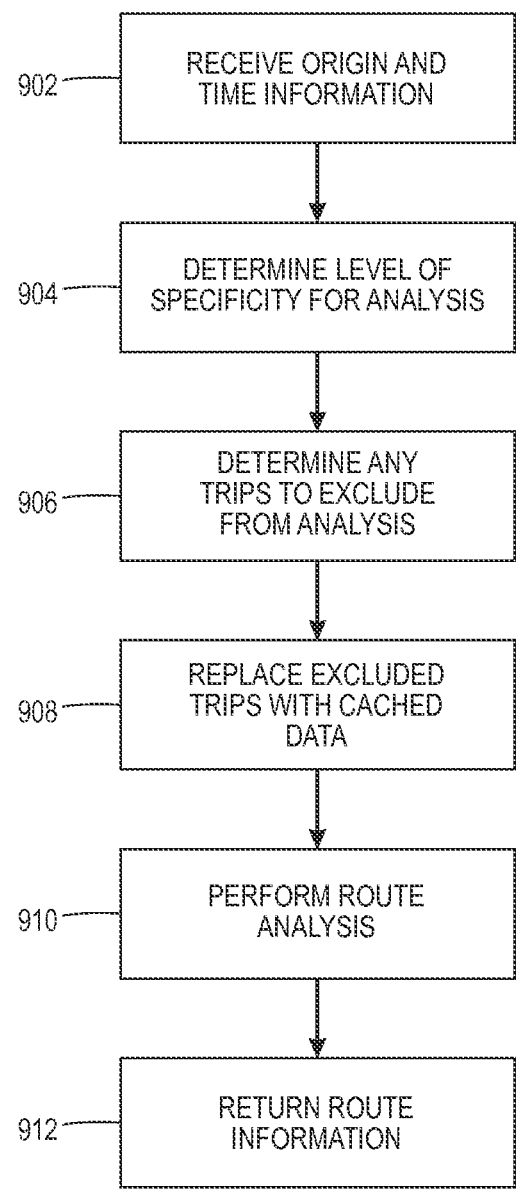
FIG. 9 depicts an improved route analysis algorithm according to an embodiment.

For example, as shown in FIG. 9, the processing device may receive 902 a listing of origins and times (either from a user or from another source) for reaching a specific destination and determine 904 a level of specificity for the subsequent route analysis. Based upon the determined level of specificity, the processing device may determine 906 any trips (or even full lines) to exclude from the analysis. For example, if the user indicates they do not want to use any light rail vehicles, the processing device may eliminate lines having light rail vehicles from the analysis. Alternatively, the excluded trip may be a first trip taken from an origin to a first stop or to a first point of transfer, or another trip along the route. Any suitable exclusion criteria may be used. Thus, when generating alternative paths, the system may select at least one trip that was used in the primary path, and exclude that trip from the development of the alternative path 906. This will ensure that the alternative path is different from the originally generated path. Optionally, rather than merely eliminate the existence of those lines from the potential results (or risk missing optimal routes from improperly excluding routes), the processing device may replace 908 the excluded lines with previously cached data (or stored data if cached data is not available) to ensure that no gaps exist in any routes being analyzed. As before, the processing device may perform 910 the route analysis and return 912 the route information to the user.

Figure 10:
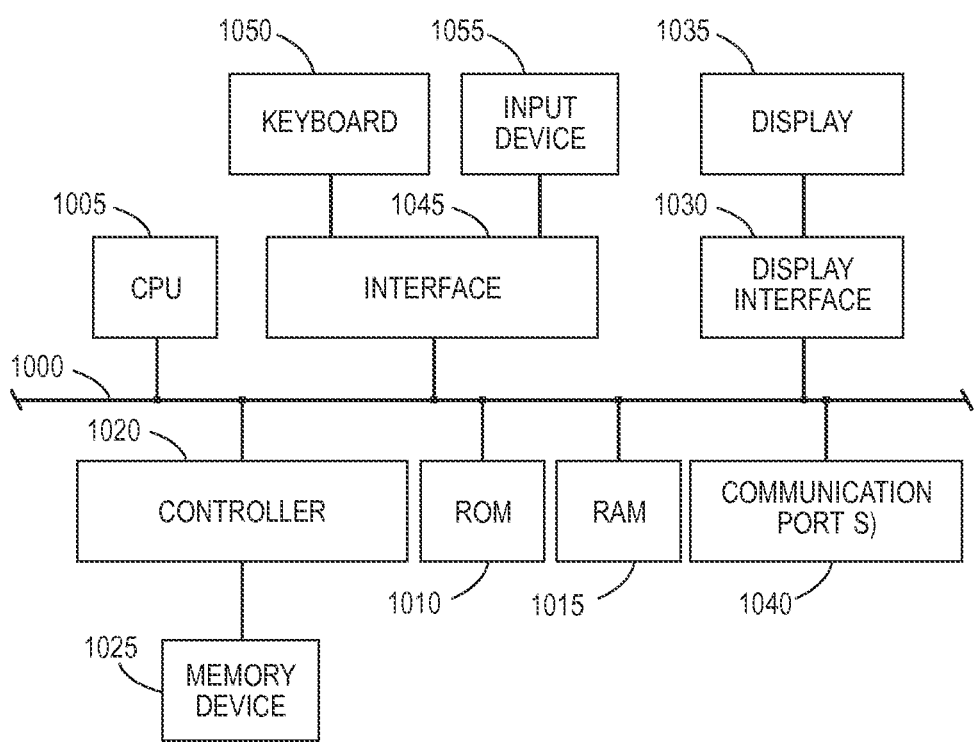
FIG. 10 depicts various embodiments of a computing device for implementing the various methods and processes described herein.

The route determination algorithms and analysis techniques as described above may be performed and implemented by one or more computing devices located at one or more locations, such as an operations center (e.g., a central operations center for a public transportation provider). FIG. 10 depicts a block diagram of various hardware that may be used to contain or implement the various computer processes and systems as discussed above. An electrical bus 1000 serves as the main information highway interconnecting the other illustrated components of the hardware. CPU 1005 is the central processing unit of the system, representing a processor (which may be a single processing device or multiple processing devices) performing calculations and logic operations required to execute a program. CPU 1005, alone or in conjunction with one or more of the other elements disclosed in FIG. 10, is a processing device, computing device or processor as such terms are used within this disclosure. Read only memory (ROM) 1010 and random access memory (RAM) 1015 constitute examples of memory devices.

A controller 1020 interfaces with one or more optional memory devices 1025 to the system bus 1000. These memory devices 1025 may include, for example, an external or internal DVD drive, a CD ROM drive, a hard drive, flash memory, a USB drive or the like. As indicated previously, these various drives and controllers are optional devices. Additionally, the memory devices 1025 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 910 and/or the RAM 1015. Optionally, the program instructions may be stored on a tangible computer readable medium such as a compact disk, a digital disk, flash memory, a memory card, a USB drive, an optical disc storage medium, a distributed storage medium such as a cloud-based architecture, and/or other recording medium.

A display interface 1030 may permit information to be displayed on the display 1035 in audio, visual, graphic or alphanumeric format. For example, the origin-destination information discussed in the context of FIGS. 6-8 may be embodied in the display 1035. Communication with external devices may occur using various communication ports 1040. A communication port 1040 may be attached to a communications network, such as the Internet or a local area network.

The hardware may also include an interface 1045 which allows for receipt of data from input devices such as a keyboard 1050 or other input device 1055 such as a mouse, a joystick, a touch screen, a remote control, a pointing device, a video input device and/or an audio input device.

As described herein, the processes and techniques, whether utilized alone or in some combination, provide specific functionality to improve upon the existing processes in a public transportation network. However, it should be noted that a public transportation system is described above by way of example only. The processes, systems and methods as taught herein may be applied to any environment where route analysis is provided to determine a listing of short and efficient routes for traveling through a network, and the algorithms and extensions as described herein may be altered accordingly based upon the transportation network being analyzed to improve reliability.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of selecting a path to reach a destination in a transportation network, the method comprising:
   receiving, by a processing device, information related to a public transportation network including a plurality of stops, wherein each of the stops comprises at least one associated link with another one of the stops;
   receiving, by the processing device, from a user via a user interface, a request to determine one or more routes to a destination within the transportation network, wherein the request comprises a selection of a primary mode of transit;
   receiving, from a global positioning service, a point of origin;
   identifying an alternate mode of transit and a configuration parameter;
   determining, by the processing device, a plurality of routes through the transportation network between the point of origin and the destination using an iterative process without reference to a graph representation of the network, so that:
      each of the plurality of routes comprises a first stop reachable via the alternate mode of transit without violating the configuration parameter, and
      a departure time for each of the plurality of routes satisfies timing information provided by the user, wherein the timing information comprises at least a start time;
   selecting, from the determined routes, a shortest path so that the shortest path corresponds to a route from the plurality of routes having an earliest arrival time at the destination;
   selecting, from the determined routes, an alternative path so that the alternative path corresponds to a route having an arrival time that is no more than a threshold amount later than the earliest arrival time; and
   generating, by the processing device, an output comprising the shortest path and the alternative path.

2. The method of claim 1, wherein determining the plurality of routes comprises:
   scanning at least one route from a first departure time;
   determining a set of subsequently reachable stops from each first stop, and a possible arrival time for each subsequently reachable stop; and
   repeating the scanning and determining until either a maximum number of iterations has been reached or no new subsequently reachable stops are identified.

3. The method of claim 2, further comprising storing, by the processing device in a computer readable medium operably connected to the processing device, a portion of each route between the origin and the destination in which the subsequently reachable stop can be reached within a threshold time, while not retaining in the computer readable medium any routes in which the subsequently reachable stop cannot be reached within a threshold time.

4. The method of claim 1, wherein the alternate mode of transit comprises walking, and the configuration parameter comprises a maximum walking time, a maximum walking distance, or both.

5. The method of claim 1, further comprising storing, by the processing device, route information for a stop being scanned in a cache for access during a next iteration of the iterative process.

6. The method of claim 1, wherein receiving the request to determine one or more routes between an origin and a destination within the transportation network further comprises receiving an alternate origin, and the method further comprises:
- including, in the plurality of routes, at least one route between the alternate origin and the destination; and
- when selecting the alternative path, selecting as the alternative path a route from the alternate origin to the destination.

7. The method of claim 1, wherein selecting the alternative path comprises:
- identifying at least one trip that makes up the shortest path; and
- excluding the identified trip from the alternative path.

8. The method of claim 1, further comprising returning the output to the user using one or more of the following:
- email;
- text; or
- via a graphical user interface.

9. The method of claim 1, wherein receiving the request to determine one or more routes between an origin and a destination within the transportation network further comprises receiving a departure time from the point of origin, and the method further comprises:
- determining an earliest trip from the point of origin after the departure time using a binary search.

10. A system for selecting a path to reach a destination in a transportation network, the system comprising:
- a processing device; and
- a computer-readable storage medium containing information relating to a public transportation network including a plurality of stops, wherein each of the stops comprises at least one associated link with another one of the stops;
- a computer-readable storage medium containing programming instructions that, when executed, cause the processing device to:
  - receive from a user, via a user interface, a request to determine one or more routes to a destination within the transportation network, wherein the request comprises a selection of a primary mode of transit;
  - receive, from a global positioning service, a point of origin;
  - identify an alternate mode of transit and a configuration parameter;
  - determine a plurality of routes through the transportation network between the point of origin and the destination using an iterative process without reference to a graph representation of the network, so that:
    - each of the plurality of routes comprises a first stop reachable via the alternate mode of transit without violating the configuration parameter, and
    - a departure time for each of the plurality of routes satisfies timing information provided by the user, wherein the timing information comprises at least a start time;
  - select, from the determined routes, a shortest path so that the shortest path corresponds to a route from the plurality of routes having an earliest arrival time at the destination;
  - select, from the determined routes, an alternative path so that the alternative path corresponds to a route having an arrival time that is no more than a threshold amount later than the earliest arrival time; and
  - generate an output comprising the shortest path and the alternative path.

11. The system of claim 10, wherein the instructions to determine the plurality of routes comprise instructions to:
- scan at least one route from a first departure time;
- determine a set of subsequently reachable stops from each first stop, and a possible arrival time for each subsequently reachable stop; and
- repeat the scanning and determining until either a maximum number of iterations has been reached or no new subsequently reachable stops are identified.

12. The system of claim 11, further comprising instructions that cause the processing device to store, in a computer readable medium operably connected to the processing device, a portion of each route between the origin and the destination in which the subsequently reachable stop can be reached within a threshold time, while not retaining in the computer readable medium any routes in which the subsequently reachable stop cannot be reached within a threshold time.

13. The system of claim 10, wherein the alternate mode of transit comprises walking, and the configuration parameter comprises a maximum walking time, a maximum walking distance, or both.

14. The system of claim 10, further comprising storing, by the processing device, route information for a stop being scanned in a cache for access during a next iteration of the iterative process.

15. The system of claim 10, wherein the instructions to receive the request to determine one or more routes between the point of origin and a destination within the transportation network further comprises instructions to enable the system to receive an alternate origin, and in response to receiving an alternate origin:
- include, in the plurality of routes, at least one route between the alternate origin and the destination; and
- when selecting the alternative path, select as the alternative path a route from the alternate origin to the destination.

16. The system of claim 10, wherein the instructions to select the alternative path comprise instructions to:
- identify at least one trip that makes up the shortest path; and
- exclude the identified trip from the alternative path.

17. A method of selecting a path to reach a destination in a transportation network, the method comprising:
- receiving, by a processing device, information related to a public transportation network including a plurality of stops, wherein each of the stops comprises at least one associated link with another one of the stops;
- receiving, by the processing device, a request from a user, via a user interface, to determine one or more routes to a destination within the transportation network, wherein the request comprises a selection of a primary mode of transit;
- receiving, from a global positioning service, a point of origin;
- identifying an alternate mode of transit and a configuration parameter;
- determining, by the processing device, a plurality of routes through the transportation network between the point of origin and the destination by:

scanning at least one route from a first departure time, wherein each route comprises a first stop, determining a set of subsequently reachable stops from each first stop, and a possible arrival time for each subsequently reachable stop, and repeating the scanning and determining until either a maximum number of iterations has been reached or no new subsequently reachable stops are identified, wherein:

each of the plurality of routes comprises a first stop reachable via the alternate mode of transit without violating the configuration parameter, and a departure time for each of the plurality of routes satisfies timing information provided by the user, wherein the timing information comprises at least a start time;

selecting, from the determined routes, a shortest path so that the shortest path corresponds to a route from the plurality of routes having an earliest arrival time at the destination;

identifying at least one trip that makes up the shortest path;

selecting, from the determined routes, an alternative path so that the alternative path excludes the identified trip and corresponds to a route having an arrival time that is no more than a threshold amount later than the earliest arrival time; and generating, by the processing device, an output comprising the shortest path and the alternative path.

18. The method of claim 17, wherein receiving the request to determine one or more routes between the point of origin and a destination within the transportation network further comprises receiving an alternate origin, and the method further comprises:

including, in the plurality of routes, at least one route between the alternate origin and the destination; and when selecting the alternative path, selecting as the alternative path a route from the alternate origin to the destination.

* * * * *